United States Patent [19]

Satoh et al.

[11] Patent Number: 5,676,802
[45] Date of Patent: Oct. 14, 1997

[54] APPARATUS FOR TREATING WASTE WATER

[75] Inventors: Kenji Satoh; Naohiko Kagawa; Sei Tange; Shun-ichi Ohya, all of Yokohama, Japan

[73] Assignee: JGC Corporation, Tokyo, Japan

[21] Appl. No.: 419,142

[22] Filed: Apr. 10, 1995

Related U.S. Application Data

[63] Continuation of Ser. No. 120,568, Sep. 14, 1993, abandoned.

[30] Foreign Application Priority Data

Jun. 23, 1993 [JP] Japan ..................... 5-152358

[51] Int. Cl.$^6$ ............... B01D 3/00; B01D 5/00; C02F 1/00
[52] U.S. Cl. ............... 202/185.2; 96/181; 96/202; 96/218; 202/234; 202/236; 202/267.1; 203/10; 203/86; 203/90
[58] Field of Search ............... 203/10, 86, 7, 203/100, 90; 159/16.1, DIG. 15, 4.01, DIG. 23; 202/236, 234, 158, 185.2, 267.1, 182, 202; 96/181, 202, 218

[56] References Cited

U.S. PATENT DOCUMENTS

| | | | |
|---|---|---|---|
| 3,189,537 | 6/1965 | Carlton | 208/47 |
| 3,634,201 | 1/1972 | Kehse | 202/183 |
| 3,927,153 | 12/1975 | Tarhan | 95/200 |
| 3,947,258 | 3/1976 | Decker | 95/229 |
| 3,960,671 | 6/1976 | Clovis et al. | 203/7 |
| 4,050,909 | 9/1977 | Ranke | 96/181 |
| 4,311,597 | 1/1982 | Bhattacharyya | 210/731 |
| 4,508,683 | 4/1985 | Doll et al. | 422/7 |
| 4,695,349 | 9/1987 | Becker et al. | 203/26 |
| 5,203,286 | 4/1993 | Yousref | 96/181 |
| 5,236,557 | 8/1993 | Müller et al. | 203/10 |

FOREIGN PATENT DOCUMENTS

| | | | |
|---|---|---|---|
| 1178084 | 5/1959 | France | 203/7 |
| 57-177301 | 11/1982 | Japan | 203/7 |
| 208503 | 5/1923 | United Kingdom | 203/7 |
| 1202936 | 8/1970 | United Kingdom | 203/7 |

*Primary Examiner*—Virginia Manoharan
*Attorney, Agent, or Firm*—Kubovcik & Kubovcik

[57] ABSTRACT

An improved apparatus for treating waste water containing volatile and corrosive substances by steam-stripping to remove the volatile and corrosive substances from the waste water. The apparatus has a liquid pooling zone installed at a part over the waste water supplying part of a stripper tower and liquid distributor at the top of the tower, and pipe arrangement is prepared to recycle liquid drawn from the liquid pooling zone to the liquid distributor. In the pipe arrangement, a cooler for the recycling liquid is installed. Serious corrosion can be avoided utilizing this apparatus.

3 Claims, 2 Drawing Sheets

APPARATUS FOR TREATING WASTE WATER

This application is a continuation application of application Ser. No. 08/120,568, filed Sep. 14, 1993, entitled "APPARATUS FOR TREATING WASTE WATER", now abandoned.

BACKGROUND OF THE INVENTION

The present invention concerns an improved apparatus for treating waste water by steam-stripping the waste water containing harmful substances, such as hydrogen sulfide and ammonia to remove the substances from the waste water.

Conventional apparatuses as used by petroleum refining plants produce waste water containing various harmful substances such as hydrogen sulfide, ammonia and cyanogen. The waste water is treated by steam-stripping to make it harmless for release. A typical flow chart of this kind of apparatus is shown in FIG. 2. In FIG. 2, numerical reference 1 indicates a stripper tower; 2, a feed drum; 3, feed/bottom heat exchanger; 4, reboiler; 8, heat exchanger taking the role of condenser; and 9, receiver.

Corrosion of the heat exchanger for cooling the gas separated from the waste water by stripping is a source of trouble for this kind of water treating apparatus. In the conventional apparatus, the gas (temperature: about 100° C.) released from the top of the stripper tower is condensed in a condenser which is a shell-and-tube type heat exchanger or a fan fin cooled type condenser to a temperature near the ambient temperature (30°-40° C.). The top gas contains hydrogen sulfide and ammonia in such a high concentration that $H_2S+NH_3$ often reaches 50 vol. %, and therefore, serious corrosion occurs at the tower top, and in the piping connected to the cooler and condenser.

As a countermeasure to this type of problem there is proposed in the prior art an apparatus in which the condenser is built in at the top of the stripper tower (stabbed-in type overhead condenser). Since the apparatus has no pipes connecting the stripper tower to the condenser, the problem of corrosion at this part is overcome. However, the cooling tubes, which are usually in the shape of hair pins, suffer from heavy corrosion, and thus, this is not a satisfactory solution.

Even if titanium is used as the material for the apparatus, its service life is only two to three years, and sometimes it is necessary to interrupt operation of the apparatus for maintenance. Thus, there has been a demand for a steam-stripping apparatus with a prolonged service life.

OBJECTS AND SUMMARY OF THE INVENTION

The major object of the present invention is to meet the above demand and provide a waste water treating apparatus with reduced corrosion so that the service life of the plant may be prolonged to ten years or more.

An additional object of the present invention is to provide waste water treating apparatus which is constructed with conventional, relatively inexpensive stainless steel, and does not have a corrosion problem.

DETAILED DESCRIPTION OF THE PREFERRED EMBODIMENTS

Figure 1:
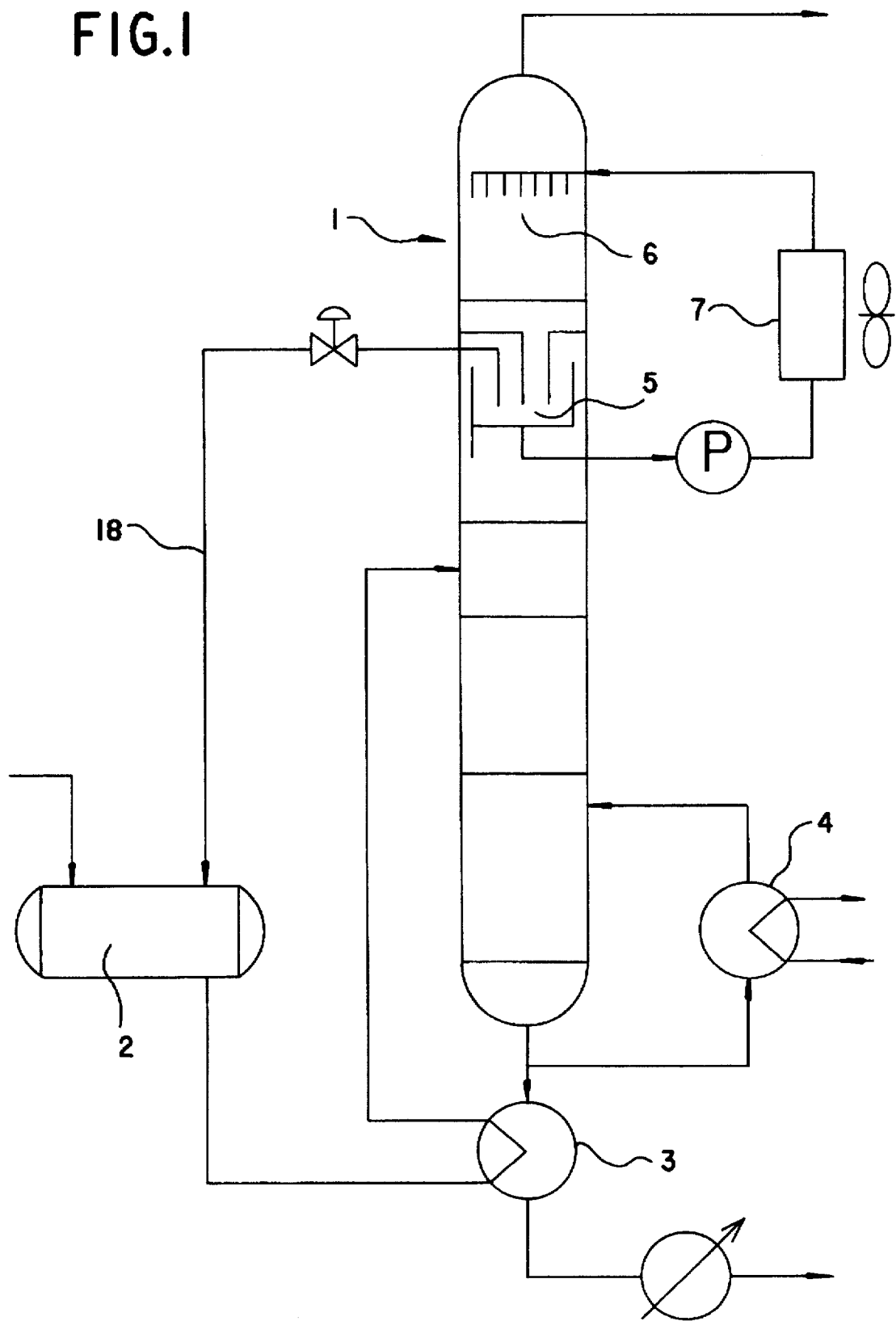
FIG. 1 is a flow chart of the waste water treating apparatus of the present invention, and at the same time, a cross section showing the structure of the stripper tower.
Figure 2:
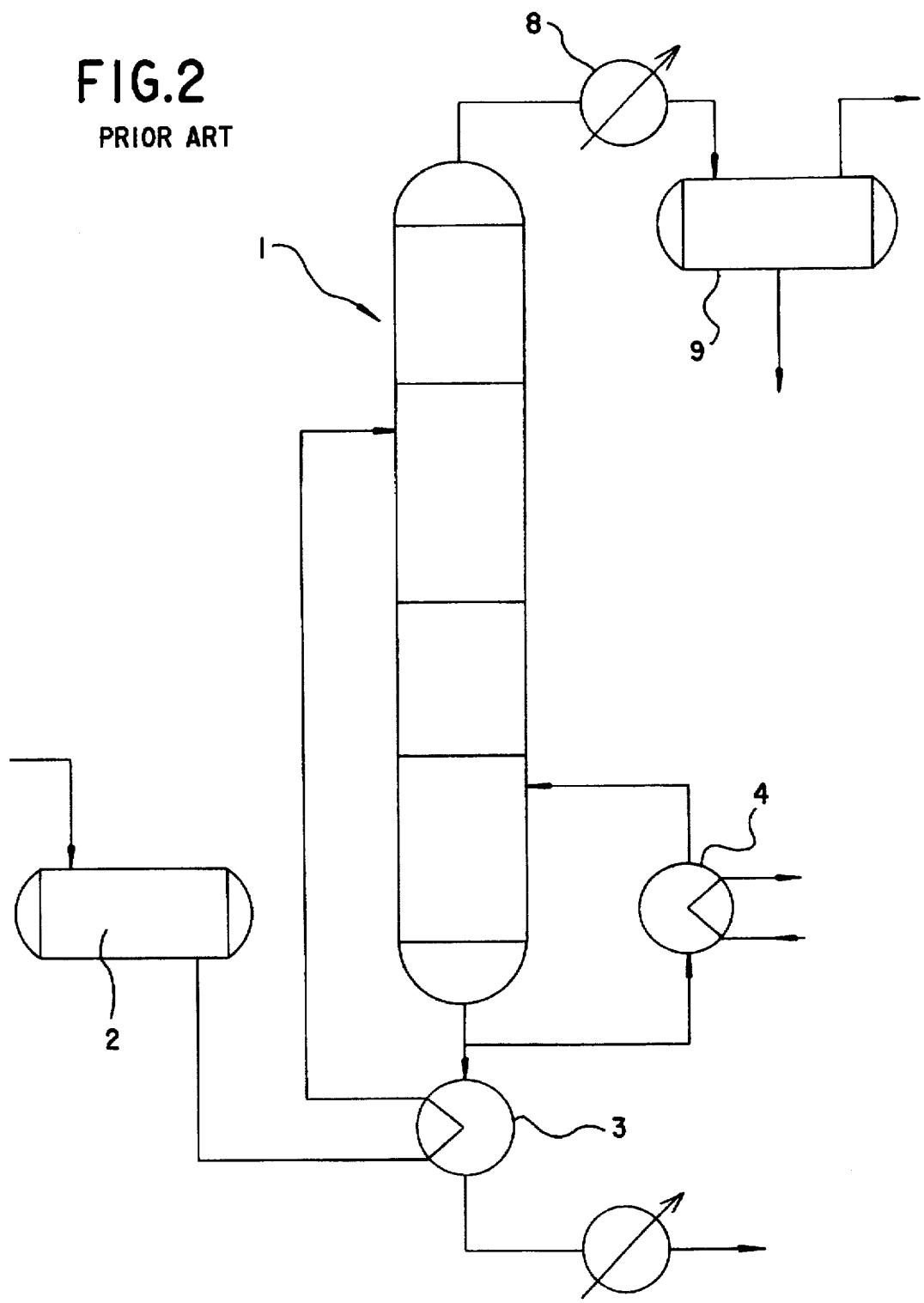
FIG. 2 illustrates a flow chart of a conventional waste water treating apparatus corresponding to FIG. 1.

The waste water treating apparatus according to the present invention is an apparatus for treating waste water containing volatile and corrosive substances by steam-stripping to remove the volatile and corrosive substances from the waste water. As shown in FIG. 1, a liquid pooling zone (5) is installed at the part over the waste water supplying part of a stripper tower (1) and a liquid distributor (6) at the top of the tower. A pipe arrangement (p) recycles the liquid drawn from the liquid pooling zone to the liquid distributor for spraying it from the distributor; and a cooler (7) for the liquid is placed along the way of the pipe arrangement. A portion of the liquid accumulating in the liquid pooling zone is withdrawn through pipe (18) and combined with the waste water in the feed drum (2).

In the conventional steam-stripping apparatus there is condensation of the gas in which volatile and corrosive substances at high concentrations coexist with water, so-called "initial condensation", on the surfaces of the cooling tubes resulting in formation of a liquid in which corrosive substances exist at high concentrations in the condensed water, and the liquid severely corrodes the metal surfaces which come into contact with the liquid.

In the present apparatus, the top gas is cooled by the liquid recycling through the stripper tower and the initial condensation takes place in the liquid. Thus, it is possible to prevent contact of the aqueous solution of the corrosive substances at high concentrations with surfaces of the metallic material of the apparatus. This is the reason why corrosion of the apparatus diminishes substantially.

In liquid which recycles at the upper part of the stripper tower, hydrogen sulfide, ammonia and some other harmful substances accumulate, and a portion of the liquid is withdrawn at suitable intervals or continuously for being subjected to further treatment.

In the treatment of waste water containing volatile, corrosive and harmful substances, such as hydrogen sulfide and ammonia, by steam-stripping to remove the harmful substances from the waste water, the present invention enables use of the apparatus for a longer period, usually ten years or more of service life of the plant without suffering from corrosion of the apparatus.

If titanium is used as the material of the apparatus, resistance to corrosion thereof is most satisfactory. Usually, it is not necessary to use titanium, but it is possible to use a stainless steel, particularly, an ordinary, relatively less expensive stainless steel to reduce the investment.

Since the corrosion problem of the apparatus is substantially solved, maintenance without temporary interruption of plant operation and stable operation is thus realized. Therefore, the present apparatus is useful for petroleum refineries, chemical plants and plants for treating various kinds of waste.

What is claimed:

1. An apparatus for treating waste water to remove volatile and corrosive substances including at least one of hydrogen sulfide and ammonia comprising:

a stripper tower having a tower top and a tower bottom;

a waste water feed Means connected with said stripper tower at a location intermediate said tower top and said tower bottom whereby a gas can release from waste water in said stripper tower to flow upwardly from a point of gas release;

a liquid pooling means in said stripper tower above said location of said waste water feed;

a liquid distributor means in said stripper tower positioned above said liquid pooling means and including a liquid spray means;

a recycling means for connecting said liquid pooling means with said liquid distributor means such that liquid drawn from said liquid pooling means can outflow as a spray from said liquid spray means to cool said gas thereby condensing said volatile and corrosive substances and retaining said volatile and corrosive substances in said spray;

a cooling means in circuit with said liquid recycling means to cool said liquid flowing from said liquid pooling means to said liquid distributor; and liquid withdrawing means connecting said liquid pooling means with said waste water feed means for removing a portion of liquid from said liquid pooling means and combining with said waste water.

2. The apparatus of claim 1, further comprising:

a reboiler attached to said stripper tower;

said reboiler drawing a bottom waste water from said tower bottom, reheating said bottom waste water, and returning said bottom waste water to said stripper tower.

3. The apparatus of claim 1, wherein said cooling means comprises a heat exchanger made of titanium.

* * * * *